(12) United States Patent
Ide et al.

(10) Patent No.: US 11,569,528 B2
(45) Date of Patent: Jan. 31, 2023

(54) SOLID ELECTROLYTE INTEGRATED DEVICE, METHOD OF MANUFACTURING SOLID ELECTROLYTE INTEGRATED DEVICE, AND SOLID ELECTROLYTE ELEMENT

(71) Applicant: MITSUI MINING & SMELTING CO., LTD., Tokyo (JP)

(72) Inventors: Shingo Ide, Saitama (JP); Isamu Yashima, Saitama (JP); Kenji Kume, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 495 days.

(21) Appl. No.: 16/604,182

(22) PCT Filed: Apr. 3, 2018

(86) PCT No.: PCT/JP2018/014331
§ 371 (c)(1),
(2) Date: Oct. 10, 2019

(87) PCT Pub. No.: WO2018/190205
PCT Pub. Date: Oct. 18, 2018

(65) Prior Publication Data
US 2020/0067135 A1   Feb. 27, 2020

(30) Foreign Application Priority Data
Apr. 10, 2017   (JP) ...................... PCT/JP2017/014709

(51) Int. Cl.
H01M 10/0562   (2010.01)
C25B 9/23   (2021.01)
C25B 1/02   (2006.01)

(52) U.S. Cl.
CPC ........... *H01M 10/0562* (2013.01); *C25B 9/23* (2021.01); *C25B 1/02* (2013.01)

(58) Field of Classification Search
None
See application file for complete search history.

(56) References Cited

U.S. PATENT DOCUMENTS

| 5,785,839 A | 7/1998 | Kleitz et al. |
| 2003/0146093 A1 | 8/2003 | Akiyama et al. |

(Continued)

FOREIGN PATENT DOCUMENTS

| CN | 1453581 A | 11/2003 |
| CN | 1573327 A | 2/2005 |

(Continued)

OTHER PUBLICATIONS

International Application No. PCT/JP2018/014331, International Preliminary Report on Patentability, dated Oct. 24, 2019.

(Continued)

*Primary Examiner* — Daniel S Gatewood
(74) *Attorney, Agent, or Firm* — Marshall, Gerstein & Borun LLP

(57) ABSTRACT

In a solid electrolyte integrated device including a substrate with electrically insulated surfaces, a first lower electrode layer and a second upper electrode layer are electrically connected to each other on a first main surface side, and a first upper electrode layer, the first lower electrode layer, the second upper electrode layer, and a second lower electrode layer transmit ions and/or have ion redox ability, contain a metal or a metal oxide or both of a metal and a metal oxide, and have a permeable portion.

11 Claims, 10 Drawing Sheets

(56) References Cited

U.S. PATENT DOCUMENTS

| | | | |
|---|---|---|---|
| 2007/0295058 A1 | | 12/2007 | Nagano et al. |
| 2015/0308002 A1 | * | 10/2015 | Onishi ...................... C25B 9/23 204/242 |
| 2016/0013140 A1 | | 1/2016 | Tsuboi et al. |

FOREIGN PATENT DOCUMENTS

| | | | |
|---|---|---|---|
| CN | 101097209 A | | 1/2008 |
| CN | 201043962 Y | | 4/2008 |
| CN | 105103332 A | | 11/2015 |
| EP | 2772473 A1 | | 9/2014 |
| JP | S63250065 A | | 10/1988 |
| JP | H10506041 A | | 6/1998 |
| JP | 2006068721 A | * | 3/2006 |
| JP | 2006315884 A | | 11/2006 |
| JP | 2007100116 A | | 4/2007 |
| JP | 2008013425 A | * | 1/2008 |
| JP | 2009-243962 A | | 10/2009 |
| JP | 2009-245663 A | | 10/2009 |
| JP | 2015222712 A | | 12/2015 |

OTHER PUBLICATIONS

Japanese Patent Application No. 2018-540178, Notice of Reasons for Refusal, dated Sep. 4, 2018.
International Application No. PCT/JP2018/014331, International Search Report, dated Jun. 26, 2018.
English translation of Office Action for corresponding Chinese Patent Application No. 2018800170456, dated Dec. 22, 2020.
Extended European Search Report for European Application No. 18784434.5 dated Nov. 6, 2020.

* cited by examiner

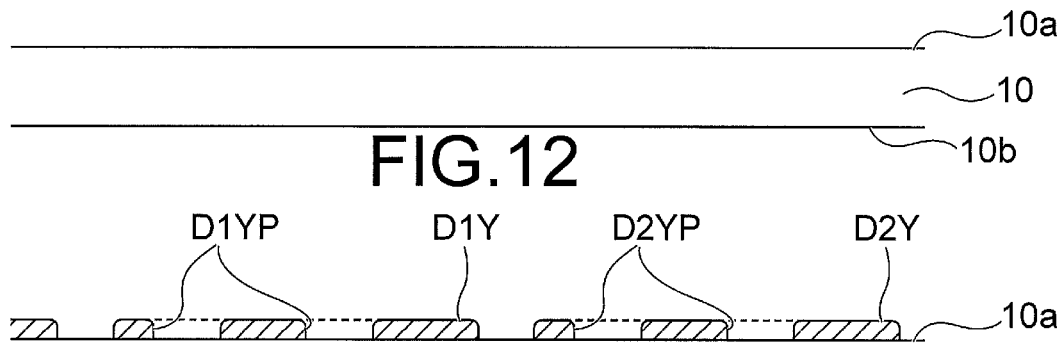
FIG.12
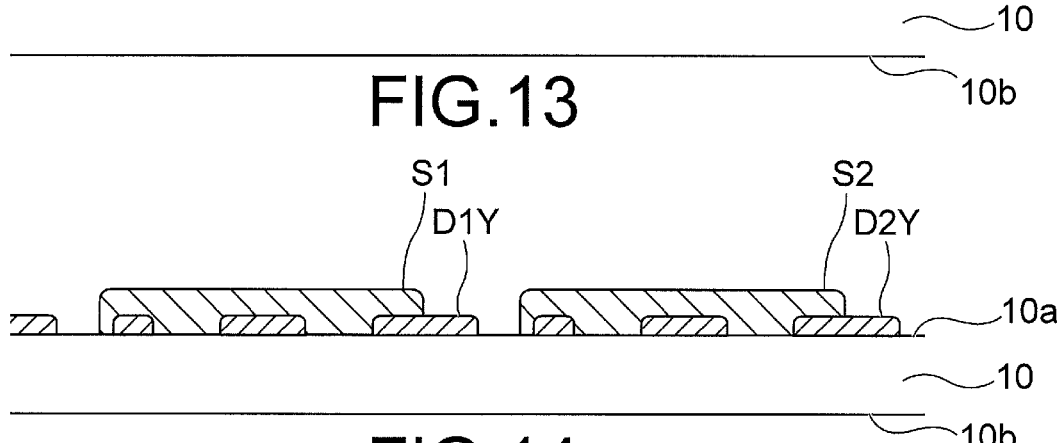
FIG.13
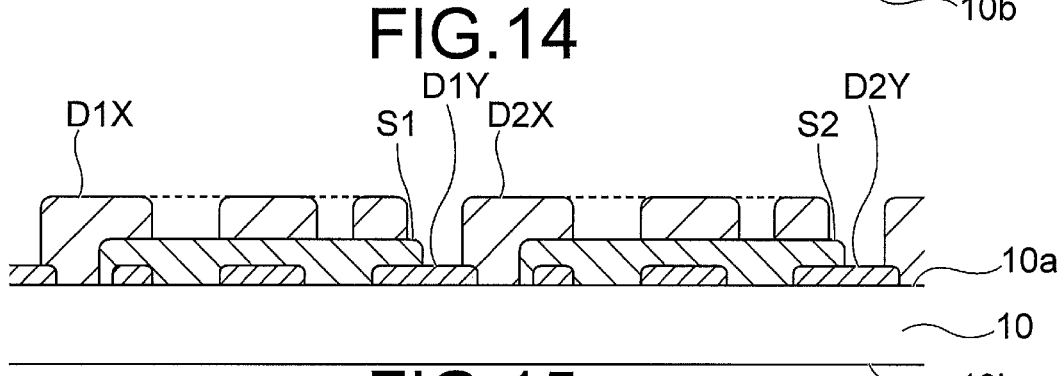
FIG.14
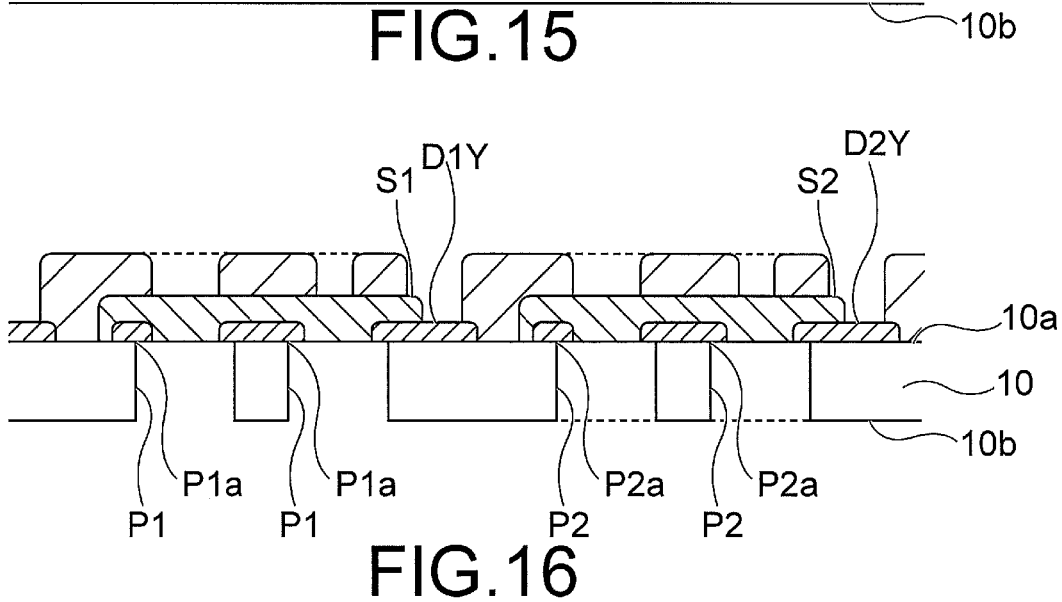
FIG.15
FIG.16

SOLID ELECTROLYTE INTEGRATED DEVICE, METHOD OF MANUFACTURING SOLID ELECTROLYTE INTEGRATED DEVICE, AND SOLID ELECTROLYTE ELEMENT

The present invention relates to a solid electrolyte integrated device, a method of manufacturing a solid electrolyte integrated device, and a solid electrolyte element.

BACKGROUND ART

Solid electrolyte elements have conventionally been used in oxygen sensors and oxygen concentrators, for example.

In order to improve the integration of solid electrolyte elements and reduce the current to be used, solid electrolyte integrated devices in which a plurality of solid electrolyte elements are connected in series and integrated are proposed (for example, Patent Documents 1 to 3).

PRIOR ART DOCUMENT

JP 2006-315884 A
JP 2007-100116 A
JP 2015-222712 A

DISCLOSURE OF THE INVENTION

Problem to be Solved by the Invention

For example, Patent Document 1 discloses a structure in which through-holes are formed in solid electrolyte layers, and a plurality of electrodes are connected in series via the through-holes. However, in this structure, stress is applied to the solid electrolyte layers in which the through-holes are formed, and the solid electrolyte integrated device may be broken due to the stress.

Patent Document 2 discloses a structure of an electrochemical cell in which a plurality of solid electrolyte elements are fixed at positioning protrusions are connected in series. This structure eliminates the need of clearance for wiring lines disposed between respective electrochemical cells, thereby reducing the size of the cells. However, in the structure disclosed in Patent Document 2, stress is applied when the solid electrolyte elements are joined to the protrusions, and the solid electrolyte elements may be damaged due to the stress.

Patent Document 3 discloses a method of manufacturing a device in which a solid electrolyte thin film (solid electrolyte layer) is sandwiched with two substrates, the method including the steps of performing anodic bonding of an upper substrate and a laminated body obtained by laminating an electrode, a solid electrolyte, and an electrode on a dummy silicon substrate, removing the dummy silicon substrate by wet etching, and performing anodic bonding of a lower substrate.

However, in the structure disclosed in Patent Document 3, stress is applied to the solid electrolyte layer when the lower substrate is bonded to the solid electrolyte layer, and the solid electrolyte layer may be damaged due to the stress.

As described above, the conventional solid electrolyte integrated devices have a problem in that stress applied to the solid electrolyte layers may damage and break the solid electrolyte integrated devices.

In order to solve this problem, an object of the present invention is to provide a solid electrolyte integrated device capable of reducing the current to be used and reducing stress to be applied to the solid electrolyte layer.

Solution to Problem

A solid electrolyte integrated device, according to an embodiment in an aspect of the present invention, includes a substrate with electrically insulated surfaces including a first main surface disposed on one side and a second main surface disposed on an opposite side of the first main surface, the substrate having two through-holes, a first through-hole and a second through-hole, between the first main surface and the second main surface, the solid electrolyte integrated device comprising: a first lower electrode layer, which is conductive, disposed on the first main surface so as to cover a portion of a first opening on the first main surface side of the first through-hole or to surround an edge of the portion of the first opening; a first solid electrolyte layer disposed on and electrically connected to the first lower electrode layer; a first upper electrode layer disposed on the first main surface side so as to be separated from the first lower electrode layer by the first solid electrolyte layer and electrically connected to the first solid electrolyte layer; a second lower electrode layer, which is conductive, disposed on the first main surface so as to cover a portion of a second opening on the first main surface side of the second through-hole or to surround an edge of the portion of the second opening; a second solid electrolyte layer disposed on the second lower electrode layer so as to be separated from the first solid electrolyte layer and electrically connected to the second lower electrode layer; and a second upper electrode layer disposed on the first main surface side so as to be separated from the second lower electrode layer by the second solid electrolyte layer and electrically connected to the second solid electrolyte layer, wherein the first lower electrode layer and the second upper electrode layer are electrically connected to each other on the first main surface side, and wherein the first upper electrode layer, the first lower electrode layer, the second upper electrode layer, and the second lower electrode layer transmit ions and/or have ion redox ability, contain a metal or a metal oxide or both of a metal and a metal oxide, and have a permeable portion.

Effects of the Invention

A solid electrolyte integrated device, a method of manufacturing a solid electrolyte integrated device, and a solid electrolyte element according to aspects of the present invention may reduce mechanical stress applied to the solid electrolyte layer.

BRIEF DESCRIPTION OF THE DRAWINGS

FIG. 12 is a cross-sectional view showing examples of respective step of the method of manufacturing the solid electrolyte integrated a device 100 according to the first modification shown in FIG. 6.

FIG. 13 is a cross-sectional view showing examples of respective step of the method of manufacturing the solid electrolyte integrated device 100, being continuous from FIG. 12.

FIG. 14 is a cross-sectional view showing examples of respective step of the method of manufacturing the solid electrolyte integrated device 100, being continuous from FIG. 13.

FIG. 15 is a cross-sectional view showing examples of respective step of the method of manufacturing the solid electrolyte integrated device 100, being continuous from FIG. 14.

FIG. 16 is a cross-sectional view showing examples of respective step of the method of manufacturing the solid electrolyte integrated device 100, being continuous from FIG. 15.

EMBODIMENTS FOR CARRYING OUT THE INVENTION

Embodiments of the present invention will be described below with reference to the accompanying drawings.

First Embodiment

Figure 1:
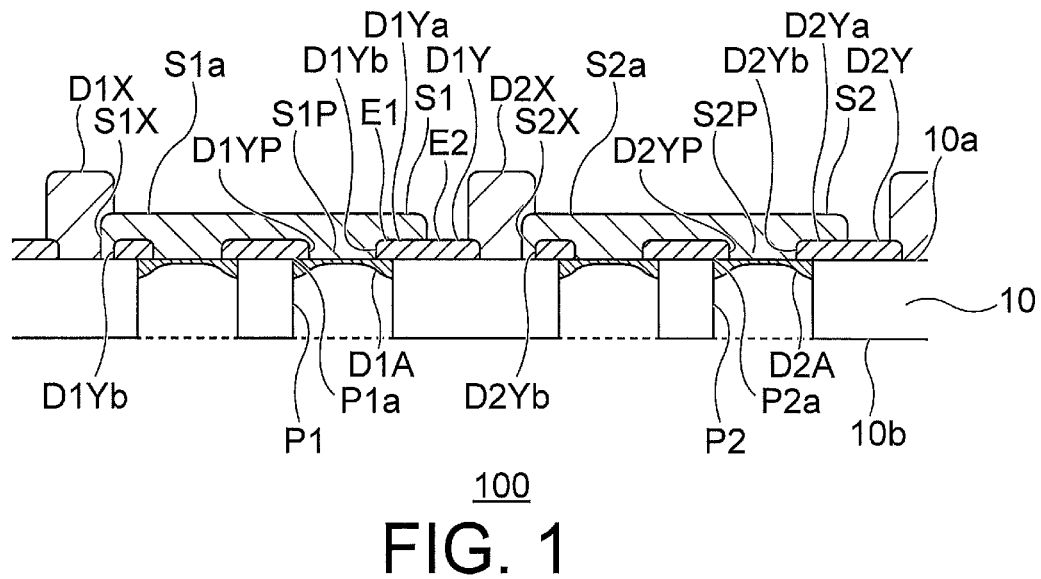
FIG. 1 is a cross-sectional view showing an example of a solid electrolyte integrated device 100 according to a first embodiment.
Figure 2:
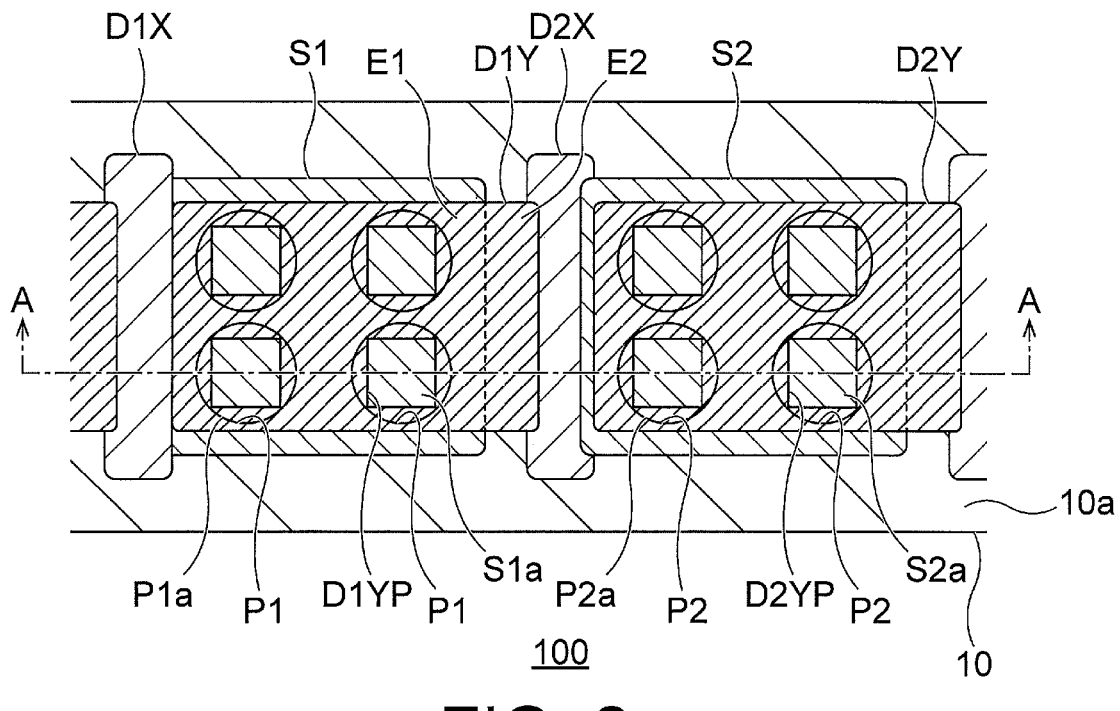
FIG. 2 is a plan view of a first main surface 10a of a substrate 10 included in the solid electrolyte integrated device 100 shown in FIG. 1, viewed from below.

FIG. 1 is a cross-sectional view showing an example of a solid electrolyte integrated device 100 according to a first embodiment. FIG. 2 is a plan view of a first main surface 10a of a substrate 10 included in the solid electrolyte integrated device 100 shown in FIG. 1, viewed from below. The cross section of FIG. 1 is taken along line A-A of FIG. 2.

In the descriptions based on the respective drawings, based on the position of the substrate 10 included in the solid electrolyte integrated device 100, a direction from a second main surface 10b to the first main surface 10a of the substrate 10 is defined as "up direction," and a direction from the first main surface 10a to the second main surface 10b is defined as "down direction." The first main surface 10a side of the substrate 10 is defined as "upper side," and the second main surface 10b side of the substrate 10 is defined as "lower side."

For example, as shown in FIGS. 1 and 2, the solid electrolyte integrated device 100 according to the first embodiment, in which a plurality of solid electrolyte layers (layers of solid electrolyte) are integrated, includes a substrate 10, a first lower electrode layer D1Y, a first solid electrolyte layer S1, a first upper electrode layer D1X, a first additional electrode layer D1A, a second lower electrode layer D2Y, a second solid electrolyte layer S2, a second upper electrode layer D2X, and a second additional electrode layer D2A. On the basis of the position of the first (second) solid electrolyte layer S1 (S2) of the solid electrolyte integrated device 100, an electrode that is connected to a top surface of the first (second) solid electrolyte layer S1 (S2) is defined as the first (second) upper electrode layer D1X (D2X), and an electrode that is connected to a lower surface of the first (second) solid electrolyte layer S1 (S2) is defines as the first (second) lower electrode layer D1Y (D2Y).

The solid electrolyte integrated device 100 may be used in an oxygen concentrator or a hydrogen producer, for example.

One solid electrolyte element may be constituted by the substrate 10, the first lower electrode layer D1Y, the first solid electrolyte layer S1, and the first upper electrode layer D1X. The solid electrolyte integrated device 100 is constituted by a plurality of solid electrolyte elements that are electrically connected in series (in the example of FIG. 1, two, which is a minimum number, of the solid electrolyte elements are shown).

Respective elements of the solid electrolyte integrated device 100 will be described below.

Substrate 10

As shown in FIGS. 1 and 2, for example, the substrate 10 has the first main surface 10a on one side and the second main surface 10b on a side opposite to the first main surface 10a. The substrate 10 has a first through-hole P1 and a second through-hole P2 opened between the first main surface 10a and the second main surface 10b. The first through-hole P1 and the second through-hole P2 of the substrate 10 are intended to allow a gas to flow between the first main surface 10a and the second main surface 10b.

The surfaces of the substrate 10 are electrically insulated. For example, the substrate 10 is formed of glass. Alternatively, the substrate 10 may be a silicon substrate, the outer surfaces of which are covered by silicon oxide.

The outer surfaces of the substrate 10 here mean the first and second main surfaces 10a and 10b and side surfaces of the substrate 10. The outer surfaces of the substrate 10 are electrically insulated so that no current flows through the substrate 10.

In more detail, the material of the substrate 10 needs to be superior in heat resistance and electrical insulation, and may be selected from glass, oxide-coated silicon, oxide-coated metal (such as Ti, Ni and their alloys), and ceramic oxide (such as $Al_2O_3$, zirconia, magnesia, and lanthanum chromite).

Glass and oxide-coated silicon are preferably selected since they are easy to make openings.

Oxide-coated silicon is more preferably selected in view of the material costs and the manufacturing costs.

In the example shown in FIGS. 1 and 2, four each of the first through-holes P1 and the second through-holes P2 are shown. However, the number of first through-holes P1 or second through-holes P2 may be one to three, or five or more.

The thickness of the substrate 10 is preferably in the range between 50 µm to 3000 µm, for example, since the substrate 10 needs to support the layers formed thereon, and the thickness in this range may allow the through-holes to be easily formed.

The first and second through-holes P1 and P2 formed in the substrate 10 have a circular shape, for example, when viewed from the first main surface side. In this case, the diameter of the circular shape of the first and second through-holes P1 and P2 is in the range between 0.01 mm and 30 mm, for example.

The shape of the first and second through-holes P1 and P2 of the substrate 10 may be other than the circular shape, such as a polygonal shape including a rectangular shape and a hexagonal shape, when viewed from the first main surface side.

First Lower Electrode Layer D1Y

As shown in FIG. 1, for example, the first lower electrode layer D1Y is disposed on the first main surface 10a to partially cover the first opening P1a on the first main surface 10a side of the first through-hole P1. Since the first lower electrode layer D1Y covers a portion of the first opening P1a, the electric potential of the first opening P1a may be controlled at a predetermined value.

The first lower electrode layer D1Y is conductive. In particular, the first lower electrode layer D1Y transmits ions and/or has ion redox ability.

As in a second embodiment described later, the first lower electrode layer D1Y may be disposed on the first main surface 10a to surround a portion of the edge of the first opening P1a on the first main surface 10a side of the first through-hole P1.

The first lower electrode layer D1Y has a third through-hole D1YP that is formed in a vertical direction to continue to the first through-hole P1 of the substrate 10, as shown in FIG. 1 for example.

A portion S1P of the first solid electrolyte layer S1 is filled in the third through-hole D1YP of the first lower electrode layer D1Y. This reduces the resistance value of the first solid electrolyte layer S1 and the electrical contact resistance between the first solid electrolyte layer S1 and the first lower electrode layer D1Y.

The first lower electrode layer D1Y contains a metal or a metal oxide, or both of them, for example, and may have a permeable portion (not shown). The permeable portion has a shape that allows a gas on the first through-hole P1 side of the first lower electrode layer D1Y may reach the interface with the first solid electrolyte layer S1. The permeable portion may have a mesh or porous feature, for example.

The thickness of the first lower electrode layer D1Y is preferably in the range between 0.01 and 1000 µm.

First Solid Electrolyte Layer S1

As shown in FIG. 1, for example, the first solid electrolyte layer S1 is disposed on and electrically connected to the first lower electrode layer D1Y. An intermediate layer having ion conductivity (not shown) may be disposed between the first solid electrolyte layer S1 and the first lower electrode layer D1Y.

The first solid electrolyte layer S1 covers a range from a portion of the top surface D1Ya to a portion of a side surface D1Yb of the first lower electrode layer D1Y. This reduces the contact resistance between the first solid electrolyte layer S1 and the first lower electrode layer D1Y.

A portion of a side surface S1X of the first solid electrolyte layer S1 is covered by the first upper electrode layer D1X. As shown in FIG. 1, for example, the first upper electrode layer D1X covers a range from a portion of a top surface S1a to a portion of the side surface S1X of the first solid electrolyte layer S1. This electrically connects the first solid electrolyte layer S1 to the first upper electrode layer D1X and reduces the contact resistance between the first solid electrolyte layer S1 and the first upper electrode layer D1X. An intermediate layer having electron-ion conductivity (not shown) may be disposed between the first solid electrolyte layer S1 and the first upper electrode layer D1X.

The first solid electrolyte layer S1 has ion conductivity, such as proton conductivity, carbonate ion conductivity, or oxide ion conductivity. If the solid electrolyte integrated device 100 is used in an oxygen concentrator, the first solid electrolyte layer S1 has oxide ion conductivity. In this case, the first solid electrolyte layer S1 has oxide ion conductivity of $1.0\times10^{-3}$ S/cm in an environment of 600°.

The thickness of the first solid electrolyte layer S1 on the first lower electrode layer D1Y is preferably in the range between 0.05 μm and 300 μm.

First Upper Electrode Layer D1X

The first upper electrode layer D1X is disposed on the first main surface 10a side so as to be separated from the first lower electrode layer D1Y by the first solid electrolyte layer S1. The first upper electrode layer D1X is conductive, and electrically connected to the first solid electrolyte layer S1.

The first upper electrode layer D1X transmits ions and/or has ion redox ability.

The first upper electrode layer D1X contains a metal or a metal oxide, or both of them, for example, and may have a permeable portion (not shown). The permeable portion has a shape that allows a gas on the surface of the first upper electrode layer D1X to reach the interface with the first solid electrolyte layer S1. The permeable portion may have a mesh or porous feature, for example.

The thickness of the first upper electrode layer D1X on the first solid electrolyte layer S1 is preferably in the range between 0.01 μm and 300 μm.

First Additional Electrode Layer D1A: Arbitrary Layer

As shown in FIG. 1, for example, the first additional electrode layer D1A is disposed near the first opening P1a in the first through-hole P1, and electrically connected to the first lower electrode layer D1Y. The first additional electrode layer D1A may reduce the resistance value of the first lower electrode layer D1Y that is electrically connected to the first additional electrode layer D1A, and also the electrical contact resistance with the first solid electrolyte layer S1.

The thickness of the first additional electrode layer D1A is preferably in the range between 0.01 μm and 300 μm.

The first additional electrode layer D1A may be omitted. In such a case, the surface of the first lower electrode layer D1Y in the first through-hole P1 is exposed.

Second Lower Electrode Layer D2Y

The second lower electrode layer D2Y is disposed on the first main surface 10a to partially cover the second opening P2a on the first main surface 10a side of the second through-hole P2. Since the second lower electrode layer D2Y covers a portion of the second opening P2a, the electric potential of the second opening P2a may be controlled at a predetermined value.

The second lower electrode layer D2Y is conductive. In particular, the second lower electrode layer D2Y transmits ions and/or has ion redox ability.

As in the second embodiment described later, the second lower electrode layer D2Y may be disposed on the first main surface 10a to surround a portion of the edge of the second opening P2a on the first main surface 10a side of the second through-hole P2.

The second lower electrode layer D2Y has a fourth through-hole D2YP that is formed in the vertical direction to continue to the second through-hole P2 of the substrate 10, as shown in FIG. 1 for example.

A portion S2P of the second solid electrolyte layer S2 is filled in the fourth through-hole D2YP of the second lower electrode layer D2Y. This reduces the resistance value of the second solid electrolyte layer S2, and the electrical contact resistance between the second solid electrolyte layer S2 and the second lower electrode layer D2Y.

The second lower electrode layer D2Y has the same structure as the first lower electrode layer D1Y described above, and contains a metal or a metal oxide, or both of them, for example, and may have a permeable portion (not shown).

The thickness of the second lower electrode layer D2Y is preferably in the range between 0.01 to 1000 μm.

The material of the second lower electrode layer D2Y and the first lower electrode layer D1Y described above is not limited as long as it is electrically conductive. Examples of such a material include a metal such as Pt, Pd, Ag, Au, W, Mo, Ta, Nb, or Ni, an alloy of these metals, a metal-based electron conductive material such as stainless steel, a ceramic-based oxygen-electron mixed conductive material such as lanthanum strontium cobalt ferrite (LSCF), barium ferrite, cobalt-manganese oxide, or lanthanum nickelate, a tin oxide-based transparent electrode material such as ITO or FTO, a zinc oxide-based transparent electrode material such as AZO or GZO, a mixture or a carrier of those materials, and a cermet mixed with the above-described solid electrolytes, but not limited to those examples.

Second Solid Electrolyte Layer S2

As shown in FIG. 1, for example, the second solid electrolyte layer S2 is disposed on the second lower electrode layer D2Y so as to be separated from the first solid electrolyte layer S1 (therefore not to be electrically connected to the first solid electrolyte layer S1 directly). The second solid electrolyte layer S2 is electrically connected to the second lower electrode layer D2Y. An intermediate layer having electron-ion conductivity (not shown) may be disposed between the second solid electrolyte layer S2 and the second lower electrode layer D2Y.

The second solid electrolyte layer S2 covers a range from a portion of a top surface D2Ya to a portion of a side surface D2Yb of the second lower electrode layer D2Y. This reduces the contact resistance between the second solid electrolyte layer S2 and the second lower electrode layer D2Y.

A portion of a side surface S2X of the second solid electrolyte layer S2 is covered by the second upper electrode layer D2X. As shown in FIG. 1, for example, the second upper electrode layer D2X covers a range from a portion of a top surface S2a to a portion of the side surface S2X of the second solid electrolyte layer S2. This electrically connects the second solid electrolyte layer S2 to the second upper electrode layer D2X and reduces the contact resistance between the second solid electrolyte layer S2 and the second upper electrode layer D2X. An intermediate layer having an ion conductivity (not shown) may be disposed between the second solid electrolyte layer S2 and the second upper electrode layer D2X.

The second solid electrolyte layer S2 has ion conductivity, such as proton conductivity, carbonate ion conductivity, and oxide ion conductivity. If the solid electrolyte integrated device 100 is used in an oxygen concentrator, the second solid electrolyte layer S2 has oxide ion conductivity. In this case, the second solid electrolyte layer S2 has the same oxide ion conductivity as the first solid electrolyte layer S1.

The thickness of the second solid electrolyte layer S2 on the second lower electrode layer D2Y is preferably in the range between 0.05 μm and 300 μm.

An inorganic solid electrolyte known as an oxide-ion conductor or a proton conductor may be used as the solid electrolyte used in the second solid electrolyte layer S2 and the first solid electrolyte layer S1 described above.

Examples of the inorganic solid electrolyte known as an oxide-ion conductor include, but are not limited to, a complex oxide having an apatite crystal structure expressed as $(RE_2O_3)_x(SiO_2)_6$ (where RE is an element selected from La, Ce, Pr, Nd, and Sm, and x meets the condition 3.5<x<6) such as lanthanum silicate or cerium silicate, a stabilized zirconia stabilized by such a material as $Y_2O_3$, $Sc_2O_3$ or $Yb_2O_3$, a Ga-based oxide (lanthanum gallate-based oxide) having a perovskite structure having a basic composition of $LaGaO_3$, and a cerium oxide in which a rare earth element is doped, such as gadolinium-doped ceria or samarium-doped ceria. The oxide-ion conductor described above may be a single compound or a complex oxide in which a plurality of compounds are arbitrarily mixed. The solid electrolyte layer may be a single layer or a multilayer member.

Examples of the inorganic solid electrolyte known as a proton conductor include, but are not limited to, a complex oxide such as barium cerium oxide ($BaCeO_3$), strontium cerium oxide ($SrCeO_3$), strontium zirconium oxide ($SrZrO_3$), calcium zirconium oxide ($CaZrO_3$), strontium titanium oxide ($SrTiO_3$), or a lanthanum-tungsten-based complex oxide. The proton conductor described above may be a single material layer or an arbitrarily mixed material layer.

Second Upper Electrode Layer D2X

The second upper electrode layer D2X is disposed on the first main surface 10a side so as to be separated from the second lower electrode layer D2Y by the second solid electrolyte layer S2. The second upper electrode layer D2X is conductive, and electrically connected to the second solid electrolyte layer S2.

The second upper electrode layer D2X transmits ions and/or has ion redox ability.

The second upper electrode layer D2X contains a metal or a metal oxide, or both of them, for example, and may have a permeable portion (not shown). The permeable portion has a shape that allows a gas on the surface of the second upper electrode layer D2X to reach the interface with the second solid electrolyte layer S2. The permeable portion may have a mesh or porous feature, for example.

The thickness of the second upper electrode layer D2X on the second solid electrolyte layer S2 is preferably in the range between 0.01 μm and 300 μm.

The electrode material of the second upper electrode layer D2X and the first upper electrode layer D1X described above is not limited as long as it is electrically conductive. Examples of such a material include, but are not limited to, a metal such as Pt, Pd, Ag, Au, W, Mo, Ta, Nb, or Ni, an alloy of these metals, a metal-based electron conductive material such as stainless steel, a ceramic-based oxygen-electron mixed conductive material such as lanthanum strontium cobalt ferrite (LSCF), barium ferrite, cobalt-manganese oxide, or lanthanum nickelate, a tin oxide-based transparent electrode material such as ITO or FTO, a zinc oxide-based transparent electrode material such as AZO or GZO, a mixture or a carrier of those materials, and a cermet mixed with the above described solid electrolytes.

Second Additional Electrode Layer D2A: Arbitrary Layer

As shown in FIG. 1, for example, the second additional electrode layer D2A is disposed near the second opening P2a in the second through-hole P2, and electrically connected to the second lower electrode layer D2Y. The second additional electrode layer D2A may reduce the resistance value of the second lower electrode layer D2Y that is electrically connected to the second additional electrode layer D2A, and also the electrical contact resistance with the second solid electrolyte layer S2.

The thickness of the second additional electrode layer D2A is preferably in the range between 0.01 μm and 300 μm.

The second additional electrode layer D2A may be omitted. In such a case, the surface of the second lower electrode layer D2Y in the second through-hole P2 is exposed.

The material of the second additional electrode layer D2A and the first additional electrode layer D1A described above may be selected from those that are superior in catalytic functionality (such as oxygen absorption ability and dissociation ability) among the above-described electrode materials. Specific examples of such a material include a metal such as Pt, Pd, Ag, or Ni, a ceramic-based oxygen-electron mixed conductive material such as lanthanum strontium cobalt ferrite (LSCF), barium ferrite, cobalt-manganese oxide, or lanthanum nickelate, a mixture or a carrier of those materials, and a cermet mixed with the above-described solid electrolytes.

Series Connection Structure

A structure of a portion where the first solid electrolyte layer S1 and the second solid electrolyte layer S2 described above are connected in series will be described below.

For example, as shown in FIGS. 1 and 2, the first lower electrode layer D1Y has a first region E1 covered by the first solid electrolyte layer S1 and a second region E2 not covered by the first solid electrolyte layer S1.

A portion of the second region E2 of the first lower electrode layer D1Y is covered by the second upper electrode layer D2X. This allows the first lower electrode layer D1Y to be electrically connected to the second upper electrode layer D2X.

A portion of the side surface S2X of the second solid electrolyte layer S2 is covered by the second upper electrode layer D2X. As shown in FIG. 1, for example, the second upper electrode layer D2X covers a range from a portion of the top surface S2a to a portion of the side surface S2X of the second solid electrolyte layer S2. In more detail, the second upper electrode layer D2X extends from a top portion of an end of the second solid electrolyte layer S2 to a top portion of an end of the first lower electrode layer D1Y.

The second solid electrolyte layer S2 is electrically connected to the second lower electrode layer D2Y by the above-described series connection structure.

The first lower electrode layer D1Y and the second upper electrode layer D2X are electrically connected to each other on the first main surface 10a side by the above-described structure. Thus, the first solid electrolyte layer S1 and the second solid electrolyte layer S2 are connected in series via the first lower electrode layer D1Y and the second upper electrode layer D2X.

The first upper electrode layer D1X is connected to a first electric potential and the second lower electrode layer D2Y is connected to a second electric potential that is different from the first electric potential. More specifically, the first upper electrode layer D1X is electrically connected to one of a positive electrode and a negative electrode of a DC power supply, and the second lower electrode layer D2Y is electrically connected to the other.

Figure 3:
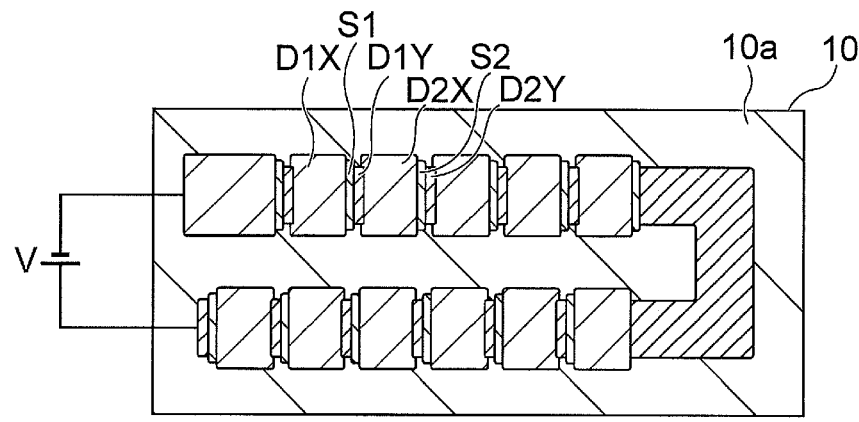
FIG. 3 is a plan view showing an example of the structure of a solid electrolyte integrated device in which a plurality of solid electrolyte elements is connected in series.
Figure 4:
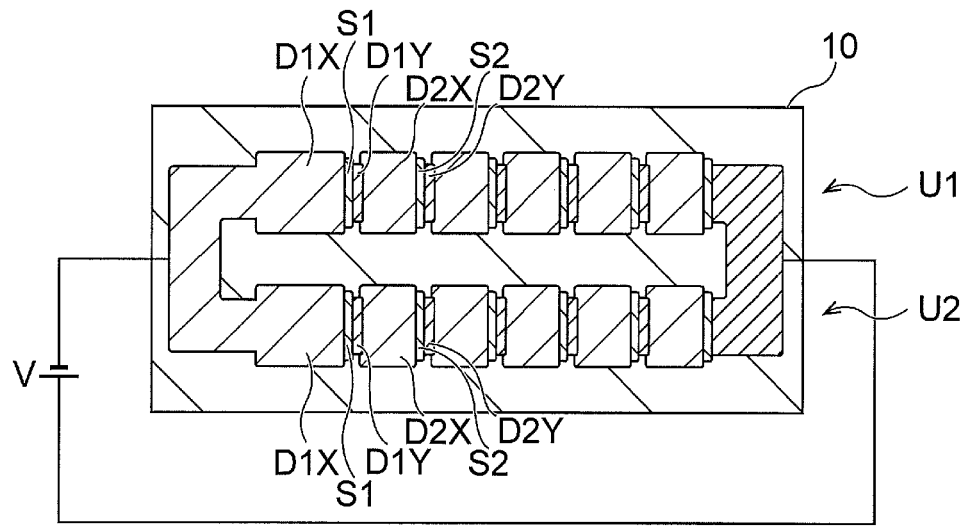
FIG. 4 is a plan view showing another example of the structure of a solid electrolyte integrated device in which a plurality of solid electrolyte elements is connected in series.
Figure 5:
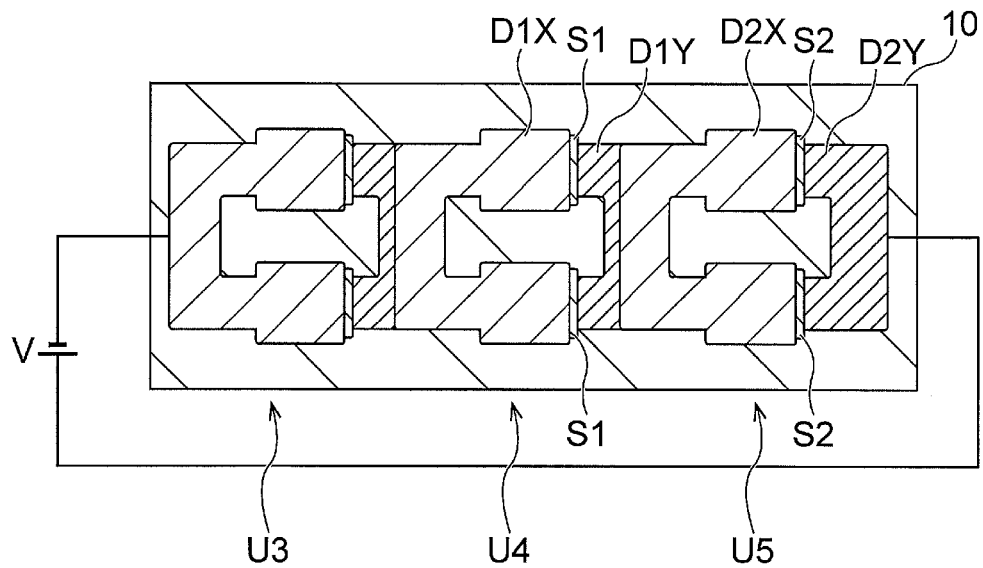
FIG. 5 is a plan view showing a further example of the structure of a solid electrolyte integrated device in which a plurality of solid electrolyte integrated devices are connected in series.

A specific example of the series connection where a DC power supply V is connected to the solid electrolyte integrated device 100 will be described below. FIG. 3 is a plan view showing an example of the structure of a solid electrolyte integrated device in which a plurality of solid electrolyte elements is connected in series. FIG. 4 is a plan view showing another example of the structure of a solid electrolyte integrated device in which a plurality of solid electrolyte elements is connected in series. FIG. 5 is a plan view showing a further example of the structure of a solid electrolyte integrated device in which a plurality of solid electrolyte integrated devices are connected in series.

In the examples shown in FIGS. 3 to 5, the first upper electrode layer D1X is electrically connected to the negative electrode of the DC power supply V, and the second lower electrode layer D2Y is electrically connected to the positive electrode of the DC power supply V.

The solid electrolyte integrated device shown in FIG. 3 has a structure in which, for example, units with a plurality of (twelve here) solid electrolyte elements including the first and second solid electrolyte layers S1 and S2 are connected in series. The structure shown in FIG. 3 has an advantageous effect that the structure itself may be used as the wiring of a circuit.

The solid electrolyte integrated device shown in FIG. 4 has a structure in which units U1 and U2 are connected in parallel, each including a plurality of (five here) series-connected solid electrolyte elements with the first and second solid electrolyte layers S1 and S2. The structure shown in FIG. 4 has an advantageous effect that even if a defect is caused in one of the units, a desired function may be performed as long as the other of the units normally operates.

The solid electrolyte integrated device shown in FIG. 5 has a structure in which a plurality of (three) units U3 to U5 are connected in series, each unit including a plurality of (two here) parallel-connected solid electrolyte elements with the first and second solid electrolyte layers S1 and S2. This structure has an advantageous effect that even if a defect is caused in one of the solid electrolyte elements in a single unit, a desired function may be performed as long as the other in the unit operate normally.

If, for example, the first upper electrode layer D1X of the solid electrolyte integrated device 100 is electrically connected to the negative electrode of the DC power supply V and the second lower electrode layer D2Y is electrically connected to the positive electrode of the DC power supply V as in the examples shown in FIGS. 3 to 5, and the solid electrolyte integrated device 100 is used in a device such as an oxygen concentrator, in which a gas passes through the solid electrolyte layers as anions, oxygen in a space on the first main surface 10a side of the substrate 10 becomes oxygen ions and passes through the solid electrolyte integrated device 100. As a result, the oxygen concentration in the space on the second main surface 10b side of the substrate 10 becomes higher. The oxygen concentration in each space can be controlled in this manner.

If, for example, the first upper electrode layer D1X of the solid electrolyte integrated device 100 is electrically connected to the positive electrode of the DC power supply V and the second lower electrode layer D2Y is electrically connected to the negative electrode of the DC power supply V, and the solid electrolyte integrated device 100 is used in a device such as a hydrogen producer, in which a gas passes through the solid electrolyte layers as cations, hydrogen in vapor, for example, on the first main surface 10a side of the substrate 10 passes through the solid electrolyte integrated device 100 as protons to supply hydrogen to a space on the second main surface 10b side of the substrate 10.

The solid electrolyte integrated device 100 according to this embodiment, in which a plurality of solid electrolyte elements with the first and second solid electrolyte layers S1 and S2 are electrically connected in series, is capable of performing a desired function at a lower current value.

Since the electrically series-connected first and second solid electrolyte layers S1 and S2 of the solid electrolyte integrated device 100 according to this embodiment are disposed on the first main surface 10a (and on the first and second lower electrode layers D1Y and D2Y) of the substrate 10 formed of a predetermined rigid material such as glass, stress applied to the first and second solid electrolyte layers S1 and S2 may be reduced.

Thus, the solid electrolyte integrated device according to this embodiment may lower the current and reduce the stress applied to the solid electrolyte layers by connecting the solid electrolyte elements in series.

The structure of the solid electrolyte integrated device 100 is not limited to the one shown in FIGS. 1 and 2, but may be those of first to third modifications that will be described below with reference to FIGS. 6 to 11.

First Modification

Figure 6:
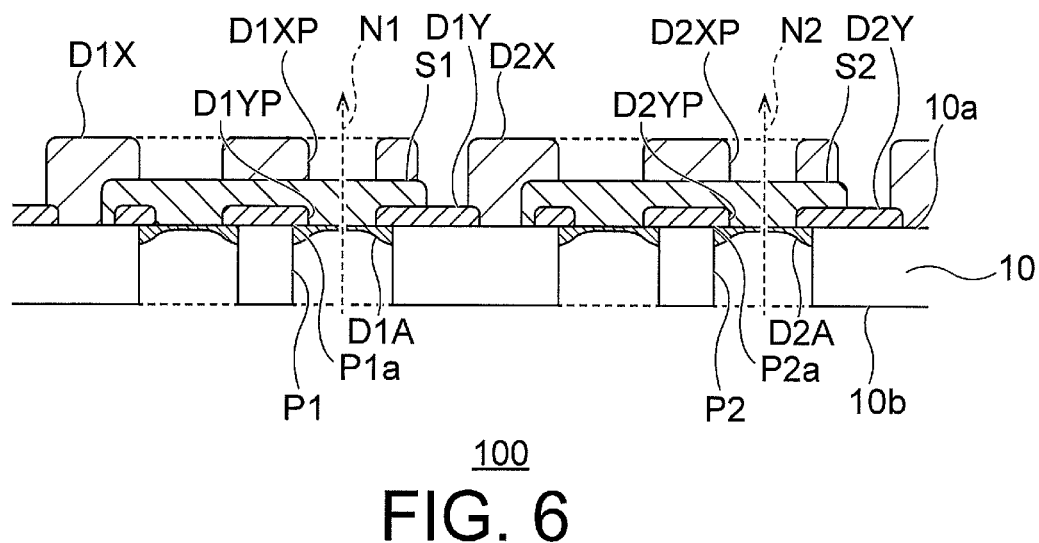
FIG. 6 is a cross-sectional view showing an example of a solid electrolyte integrated device 100 according to a first modification.
Figure 7:
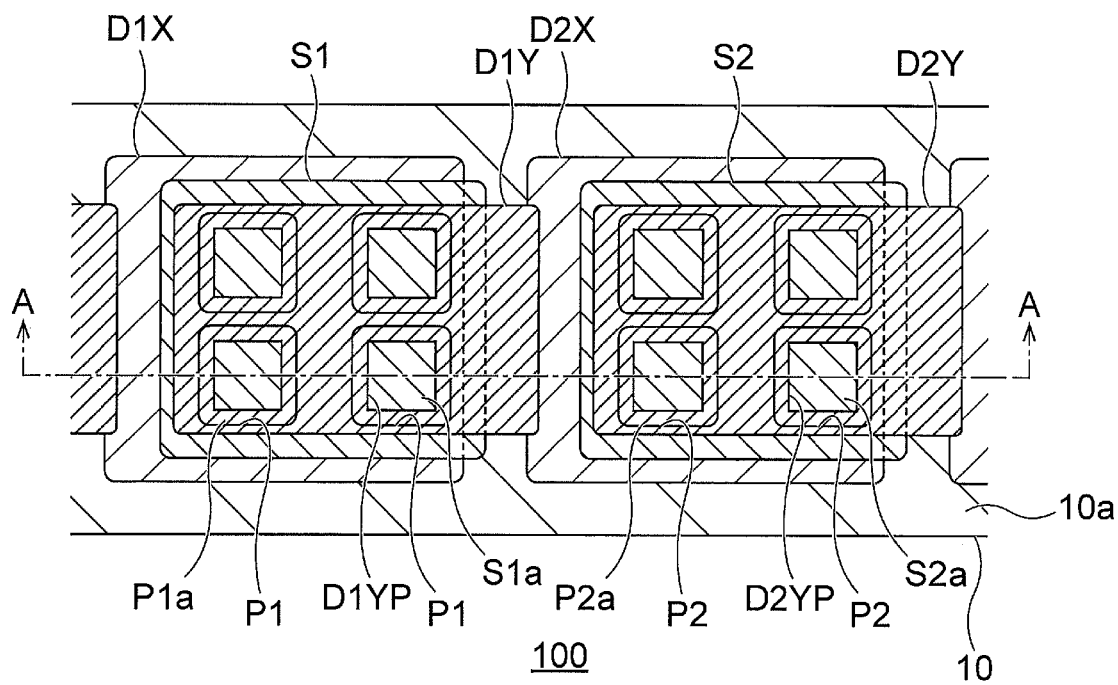
FIG. 7 is a plan view of a substrate 10 of the solid electrolyte integrated device 100 shown in FIG. 6, viewed from a first main surface 10a side.

FIG. 6 is a cross-sectional view showing an example of a solid electrolyte integrated device 100 according to a first modification. FIG. 7 is a plan view of a substrate 10 of the solid electrolyte integrated device 100 shown in FIG. 6, viewed from a first main surface 10a side. The cross section of FIG. 6 is taken along line A-A in FIG. 7.

As shown in FIGS. 6 and 7, a fifth through-hole D1XP may be formed through a first upper electrode layer D1X in a vertical direction, which is a direction of a normal line N1 that is perpendicular to the first main surface 10a.

Similarly, a sixth through-hole D2XP may be formed through a second upper electrode layer D2X in the vertical direction, which is a direction of a normal line N2 that is perpendicular to the first main surface 10a, the normal line N2 passing through a fourth through-hole D2YP formed in a second lower electrode layer D2Y.

Sections of first and second through-holes P1 and P2 formed in the substrate 10 have a rectangular (polygonal) shape in the first modification.

The other features in the structure of the solid electrolyte integrated device 100 according to the first modification are the same as those of the first embodiment.

Second Modification

Figure 8:
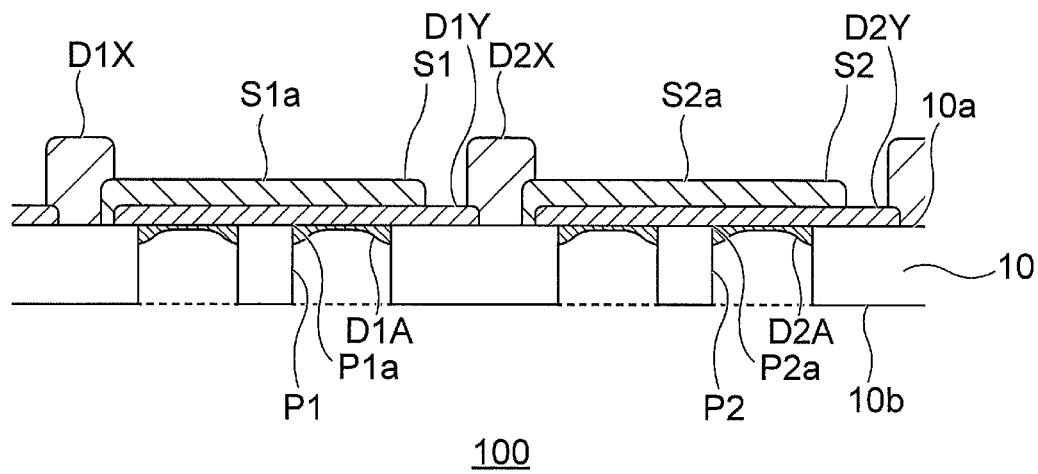
FIG. 8 is a cross-sectional view showing an example of a solid electrolyte integrated device 100 according to a second modification.
Figure 9:
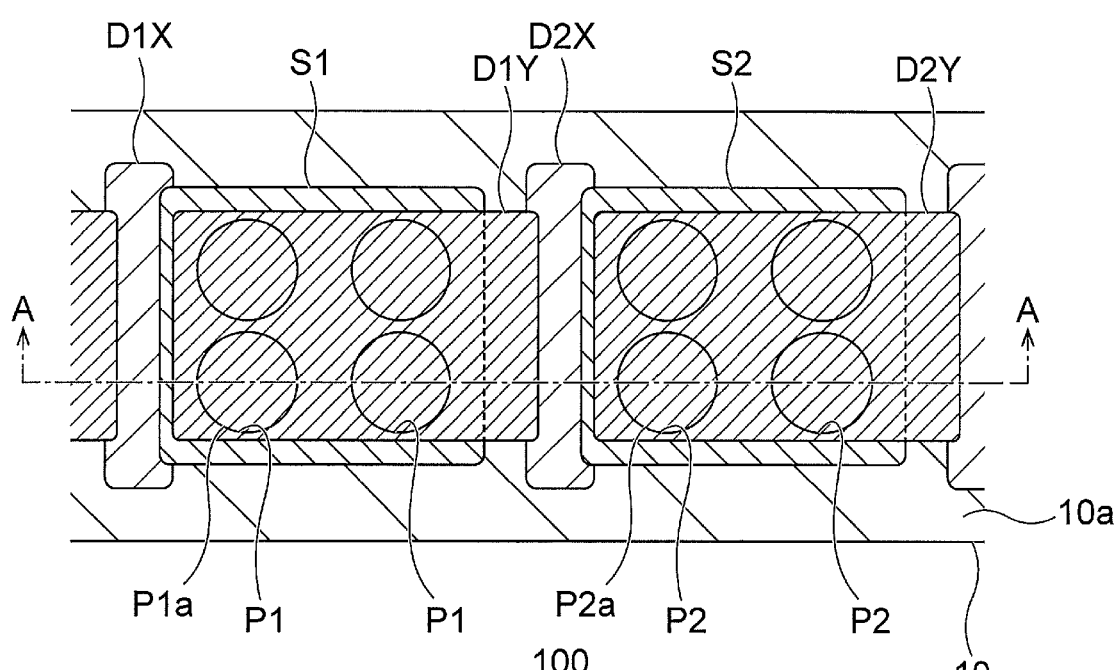
FIG. 9 is a plan view of a substrate 10 of the solid electrolyte integrated device 100 shown in FIG. 8 viewed from a first main surface 10a side.

FIG. 8 is a cross-sectional view showing an example of a solid electrolyte integrated device 100 according to a second modification. FIG. 9 is a plan view of a substrate 10 of the solid electrolyte integrated device 100 shown in FIG. 8 viewed from a first main surface 10a side. The cross section of FIG. 8 is taken along line A-A in FIG. 9.

As shown in FIGS. 8 and 9, a first lower electrode layer D1Y may be disposed on the first main surface 10a so as to fully cover a first opening P1*a* of a first through-hole P1 on the first main surface 10*a* side.

Similarly, the second lower electrode layer D2Y may be disposed on the first main surface 10*a* so as to fully cover a second opening P2*a* of a second through-hole P2 on the first main surface 10*a* side.

The other features in the structure of the solid electrolyte integrated device 100 according to the second modification are the same as those of the first embodiment.

Third Modification

Figure 10:
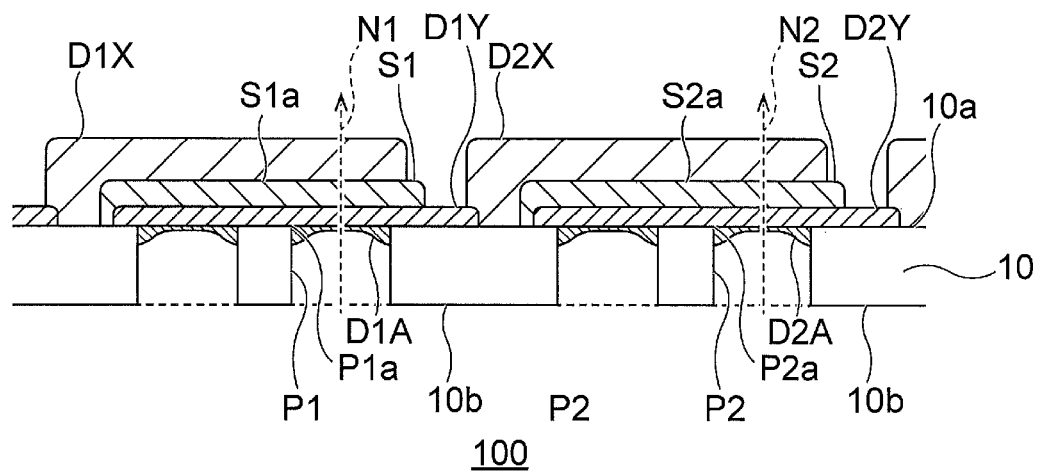
FIG. 10 is a cross-sectional view showing an example of a solid electrolyte integrated device 100 according to a third modification.
Figure 11:
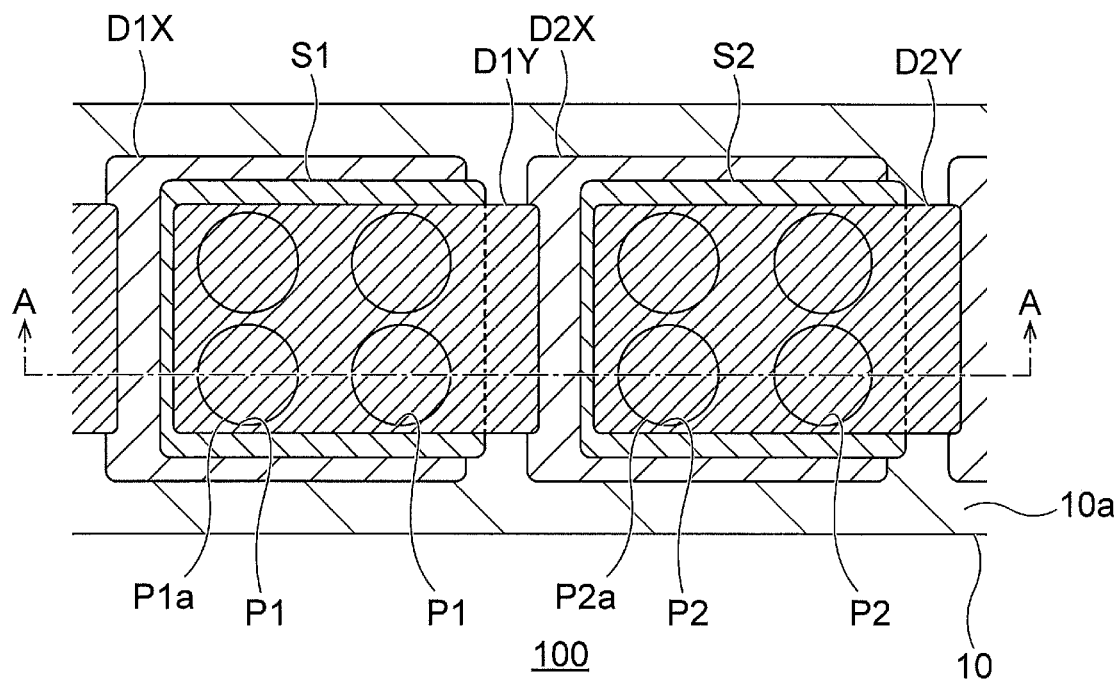
FIG. 11 is a plan view of a first main surface 10a of a substrate 10 of the solid electrolyte integrated device 100 shown in FIG. 10 viewed from below.

FIG. 10 is a cross-sectional view showing an example of a solid electrolyte integrated device 100 according to a third modification. FIG. 11 is a plan view of a first main surface 10*a* of a substrate 10 of the solid electrolyte integrated device 100 shown in FIG. 10 viewed from below. The cross section of FIG. 10 is taken along line A-A in FIG. 11.

As shown in FIGS. 10 and 11, a first upper electrode layer D1X may extend over a first solid electrolyte layer S1 through which a normal line N1 that is perpendicular to the first main surface 10*a* passes, the normal line N1 passing through the first through-hole P1.

Similarly, a second upper electrode layer D2X may extend over a second solid electrolyte layer S2, through which a normal line N2 that is perpendicular to the first main surface 10*a* passes, the normal line N2 passing through the second through-hole P2.

The other features of the solid electrolyte integrated device 100 according to the third modification are the same as those of the first embodiment.

An example of a method of manufacturing a solid electrolyte integrated device 100 having the structure of the first modification shown in FIG. 6, in which a plurality of solid electrolyte elements having the above-described structure are integrated, will be described below. Methods of manufacturing the solid electrolyte integrated device according to any of the first embodiment and other modifications can be explained in the same manner.

FIGS. 12 to 16 are cross-sectional views showing examples of respective steps of the method of manufacturing the solid electrolyte integrated device 100 according to the first modification shown in FIG. 6.

First, as shown in FIG. 12, a substrate 10 having a first main surface 10*a* and a second main surface 10*b* that is opposite to the first main surface 10*a* is prepared, the surfaces of the substrate 10 being electrically insulated (first step).

Next, as shown in FIG. 13, a first lower electrode layer D1Y and a second lower electrode layer D2Y, which are conductive, are formed on the first main surface 10*a* of the substrate 10 (second step).

The first lower electrode layer D1Y and the second lower electrode layer D2Y may be selectively formed on the first main surface 10*a* of the substrate 10 by printing a paste pattern containing a metal ink on the first main surface 10*a* of the substrate 10, and burning the printed paste pattern.

The first lower electrode layer D1Y and the second lower electrode layer D2Y may also be selectively formed on the first main surface 10*a* of the substrate 10 by selectively forming a mask resist on the first main surface 10*a* of the substrate 10 for the masking, forming a thin film containing a metal by sputtering or printing, removing the mask resist, and burning the thin film remaining on the first main surface 10*a* of the substrate 10.

Next, as shown in FIG. 14, a first solid electrolyte layer S1 having ion conductivity is disposed on the first lower electrode layer D1Y and electrically connected to the first lower electrode layer D1Y, and a second solid electrolyte layer S2 having ion conductivity is disposed on the second lower electrode layer D2Y so as to be separated from the first solid electrolyte layer S1 and electrically connected to the second lower electrode layer D2Y (third step).

For example, the first solid electrolyte layer S1 and the second solid electrolyte layer S2 may be formed by selectively depositing a solid electrolyte by radio frequency (RF) sputtering using the lithographic technique, and performing the burning.

Thereafter, as shown in FIG. 15, a first upper electrode layer D1X is formed on the first main surface 10*a* side so as to be separated from the first lower electrode layer D1Y by the first solid electrolyte layer S1 (fourth step).

Furthermore, in the fourth step, a second upper electrode layer D2X is formed on the first main surface 10*a* so as to be separated from the second lower electrode layer D2Y by the second solid electrolyte layer S2.

For example, a paste pattern containing a metal ink is printed on the first main surface 10*a* side so as to be separated from the first lower electrode layer D1Y by the first solid electrolyte layer S1, and separated from the second lower electrode layer D2Y by the second solid electrolyte layer S2.

By burning the printed paste pattern, the first upper electrode layer D1X that is electrically connected to the first solid electrolyte layer S1 and the second upper electrode layer D2X that is electrically connected to the second solid electrolyte layer S2 may be selectively formed.

The first lower electrode layer D1Y and the second lower electrode layer D2Y may also be selectively formed on the first main surface 10*a* of the substrate 10 by selectively forming a mask resist on the first main surface 10*a* of the substrate 10 for the masking, forming a thin film containing a metal by sputtering or printing, removing the mask resist, and burning the thin film remaining on the first main surface 10*a* of the substrate 10.

By the step shown in FIG. 15, the first lower electrode layer D1Y and the second upper electrode layer D2X are electrically connected to each other on the first main surface 10*a*.

Subsequently, as shown in FIG. 16, a first through-hole P1 and a second through-hole P2 are formed between the first main surface 10*a* and the second main surface 10*b* of the substrate 10 from the second main surface 10*b* side (fifth step).

For example, the first through-hole P1 and the second through-hole P2 may be formed by selectively etching the substrate 10 from the second main surface 10*b* side by reactive ion etching (RIE).

The first through-hole P1 is formed such that the first lower electrode layer D1Y covers a portion of a first opening P1*a* of the first through-hole P1 on the first main surface 10*a* side. Similarly, the second through-hole P2 is formed such that the second lower electrode layer D2Y covers a portion of a second opening P2*a* of the second through-hole P2 on the first main surface 10*a* side.

After the fifth step shown in FIG. 16, a first additional electrode layer D1A that is electrically connected to the first lower electrode layer D1Y is formed near the first opening P1*a* of the first through-hole P1. Furthermore, a second additional electrode layer D2A that is electrically connected to the second lower electrode layer D2Y is formed near the second opening P2*a* of the second through-hole P2 (sixth step).

For example, a paste pattern containing a metal ink is printed near the first opening P1a of the first through-hole P1 and the second opening P2a of the second through-hole P2 from the second main surface 10b side, and the printed paste pattern is burned. The first additional electrode layer D1A and the second additional electrode layer D2A are selectively formed in this manner.

The first additional electrode layer D1A and the second additional electrode layer D2A may also be selectively formed by selectively forming a mask resist on the second main surface 10b side of the substrate 10 for the masking, forming a thin film containing a metal by sputtering or printing, removing the mask resist, and burning the thin film remaining near the first opening P1a of the first through-hole P1 and the second opening P2a of the second through-hole P2.

The solid electrolyte integrated device 100 according to the first modification shown in FIG. 6 is completed in the above-described steps.

According to the above-described method, the first and second solid electrolyte layers S1 and S2 are formed on the first main surface 10a (and 8 on the first and second lower electrode layers D1Y and D2Y) of the rigid substrate 10 (third step shown in FIG. 14). Therefore, mechanical stress applied to the first and second solid electrolyte layers S1 and S2 during the manufacturing process may be reduced.

In the manufacturing process shown in FIGS. 12 to 16 described above, the through-holes are formed in the substrate after the respective elements of the solid electrolyte integrated device are formed. However, they may be formed in advance before forming the respective elements of the solid electrolyte integrated device.

Another example of the method of manufacturing the solid electrolyte integrated device 100 according to the first modification shown in FIG. 6 will be described below, in which the through-holes are formed in the substrate in advance before the respective elements of the solid electrolyte integrated device are formed. This method may also apply to the first embodiment and other modifications of the first embodiment.

FIGS. 17 to 24 are cross-sectional views showing another example of the method of manufacturing the solid electrolyte integrated device 100 according to the first modification shown in FIG. 6.

Figure 17:
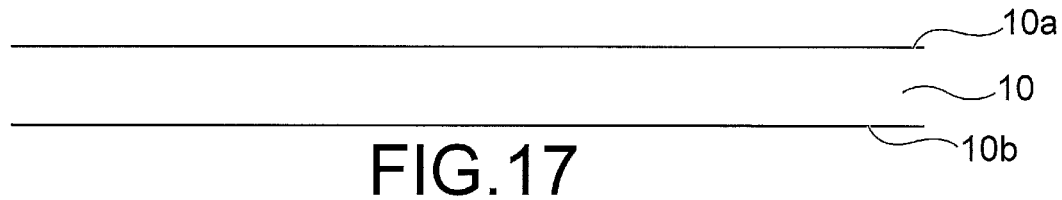
FIG. 17 is a cross-sectional views showing another example of the method of manufacturing the solid electrolyte integrated device 100 according to the first modification shown in FIG. 6.

First, as shown in FIG. 17, a substrate 10 having a first main surface 10a and a second main surface 10b that is opposite to the first main surface 10a is prepared, the surfaces of the substrate 10 being electrically insulated, as in the case of the first step described above.

Figure 18:
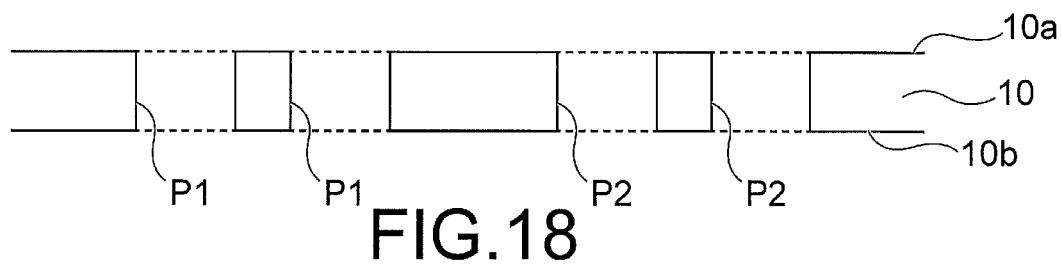
FIG. 18 is a cross-sectional view showing examples of respective step of the method of manufacturing the solid electrolyte integrated device 100, being continuous from FIG. 17.

Next, as shown in FIG. 18, a first through-hole P1 and a second through-hole P2 are formed between the first main surface 10a and the second main surface 10b by reactive ion etching, for example.

Figure 19:
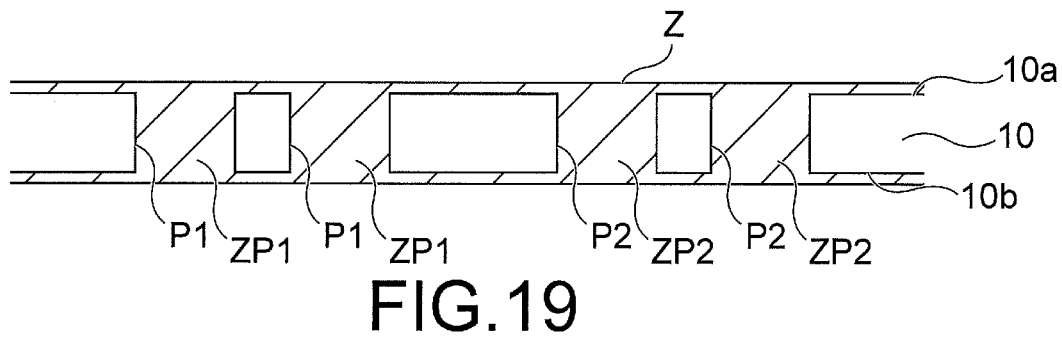
FIG. 19 is a cross-sectional view showing examples of respective step of the method of manufacturing the solid electrolyte integrated device 100, being continuous from FIG. 18.

Thereafter, as shown in FIG. 19, a metal Z (temporary filling member) such as copper is filled in the first through-hole P1 and the second through-hole P2 by plating, for example. In this case, the metal Z is deposited on the first main surface 10a and the second main surface 10b as shown in FIG. 19.

Figure 20:
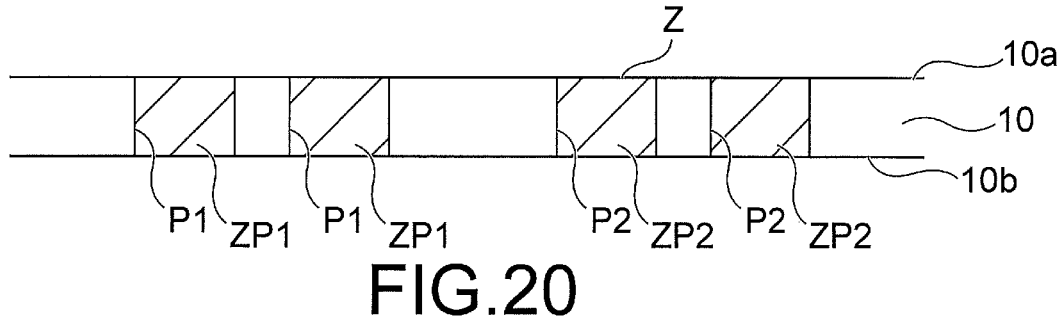
FIG. 20 is a cross-sectional view showing examples of respective step of the method of manufacturing the solid electrolyte integrated device 100, being continuous from FIG. 19.

Subsequently, the films of metal Z on the first main surface 10a and the second main surface 10b of the substrate 10 are polished and removed by chemical mechanical polishing (CMP), for example, as shown in FIG. 20.

Figure 21:
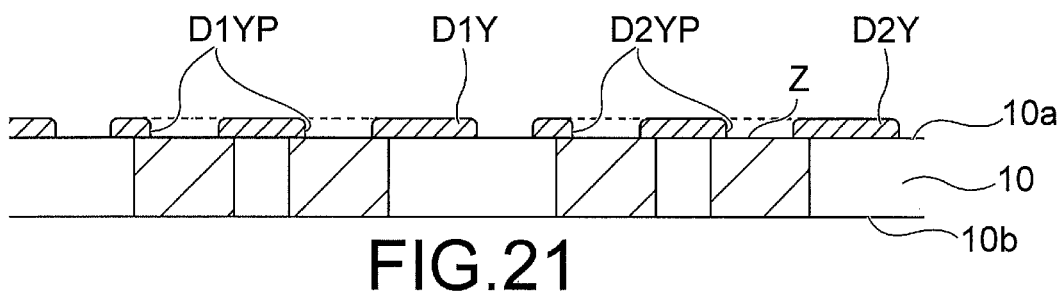
FIG. 21 is a cross-sectional view showing examples of respective step of the method of manufacturing the solid electrolyte integrated device 100, being continuous from FIG. 20.

Thereafter, as in the above-described second step, a first lower electrode layer D1Y and a second lower electrode layer D2Y, which are conductive, are formed on the first main surface 10a (including the surfaces of the metal Z in the first and second through-holes P1 and P2 on the first main surface 10a side) of the substrate 10, as shown in FIG. 21.

Figure 22:
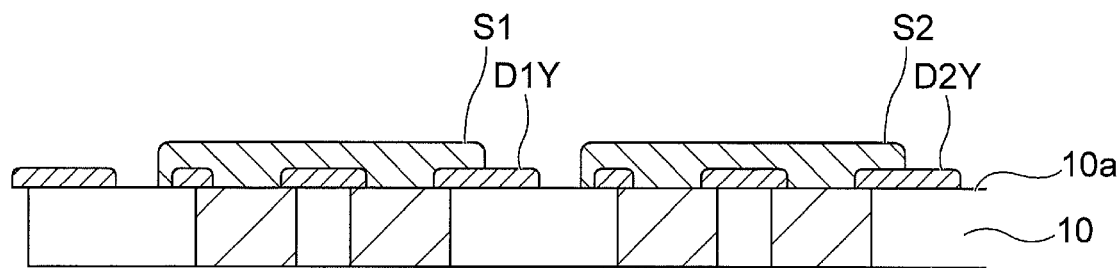
FIG. 22 is a cross-sectional view showing examples of respective step of the method of manufacturing the solid electrolyte integrated device 100, being continuous from FIG. 21.

Then, as in the third step described above, a first solid electrolyte layer S1 is disposed on and electrically connected to the first lower electrode layer D1Y, as shown in FIG. 22. Furthermore, a second solid electrolyte layer S2 is disposed on the second lower electrode layer D2Y so as to be electrically connected to the second lower electrode layer D2Y and separated from the first solid electrolyte layer S1.

Figure 23:
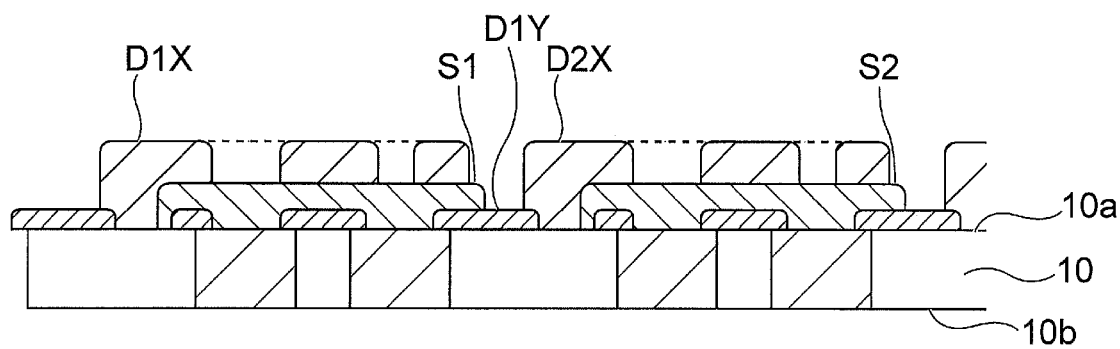
FIG. 23 is a cross-sectional view showing examples of respective step of the method of manufacturing the solid electrolyte integrated device 100, being continuous from FIG. 22.

Thereafter, as in the fourth step described above, a first upper electrode layer D1X is formed on the first main surface 10a so as to be separated from the first lower electrode layer D1Y by the first solid electrolyte layer S1 as shown in FIG. 23, the first upper electrode layer D1X being conductive and electrically connected to the first solid electrolyte layer S1. Furthermore, a second upper electrode layer D2X is formed on the first main surface 10a side so as to be separated from the second lower electrode layer D2Y by the second solid electrolyte layer S2, the second upper electrode layer D2X being conductive and electrically connected to the second solid electrolyte layer S2.

By the step shown in FIG. 23, the first lower electrode layer D1Y and the second upper electrode layer D2X are electrically connected to each other on the first main surface 10a side.

Figure 24:
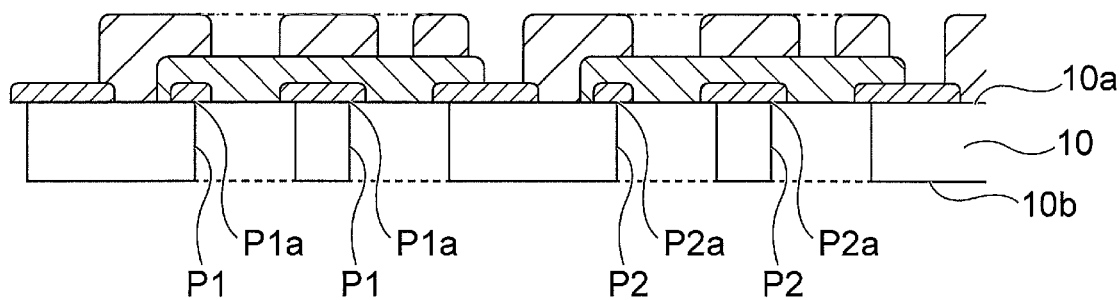
FIG. 24 is a cross-sectional view showing examples of respective step of the method of manufacturing the solid electrolyte integrated device 100, being continuous from FIG. 23.

Next, as in the fifth step described above, the first through-hole P1 and the second through-hole P2 between the first main surface 10a and the second main surface 10b of the substrate 10 are formed from the second main surface 10b side, as shown in FIG. 24.

The first through-hole P1 and the second through-hole P2 may be formed by selectively etching the metal Z (temporary filling member) in the first and second through-holes P1 and P2 by wet etching from the second main surface 10b side, for example.

After the step shown in FIG. 24, as in the sixth step described above, a first additional electrode layer D1A that is electrically connected to the first lower electrode layer D1Y is formed near the first opening P1a of the first through-hole P1. Furthermore, a second additional electrode layer D2A that is electrically connected to the second lower electrode layer D2Y is formed near the second opening P2a of the second through-hole P2.

The solid electrolyte integrated device 100 according to the first modification shown in FIG. 6 may be manufactured in the above-described steps.

Second Embodiment

In the first embodiment described above, the lower electrode layer is disposed on the first main surface so as to partially cover the opening on the first main surface side of the through-hole formed in the substrate.

However, as described above, the lower electrode layer may perform a function of transmitting ions in the solid electrolyte integrated device even if it is disposed on the first main surface to surround a portion of the edge of the opening on the first main surface of the through-hole formed in the substrate.

An example of a solid electrolyte integrated device according to a second embodiment, in which the lower electrode layer is disposed on the first main surface so as to surround a portion of the edge of the opening on the first main surface side of the through-hole in the substrate, will be described below.

Figure 25:
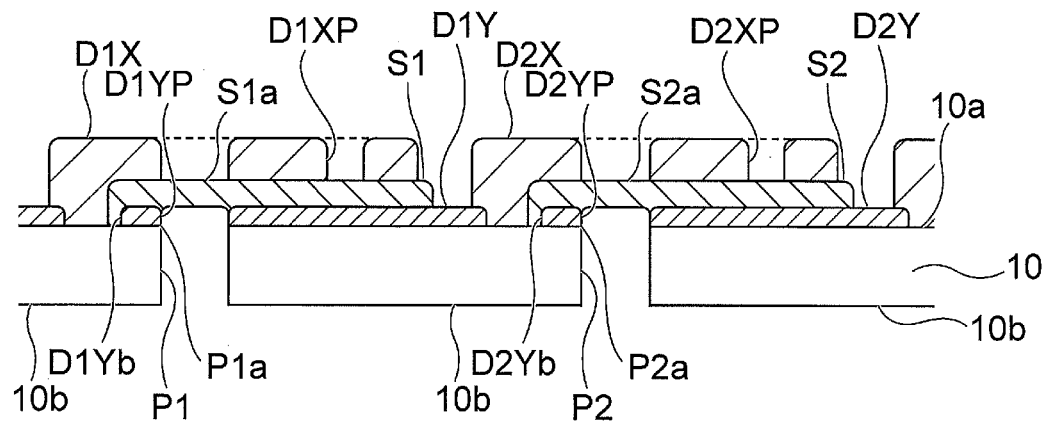
FIG. 25 is a cross-sectional view showing an example of a solid electrolyte integrated device 100 according to a second embodiment.

FIG. 25 is a cross-sectional view showing an example of a solid electrolyte integrated device 100 according to a second embodiment. In the example shown in FIG. 25, a single solid electrolyte layer (one unit) has one through-hole. In FIG. 25, the reference symbols that are the same as those in FIG. 1 indicate the same elements as those of the first embodiment. No explanation is made for such elements.

For example, as shown in FIG. 25, the solid electrolyte integrated device 100 according to the second embodiment, in which a plurality of solid electrolyte layers (layers of solid electrolyte) are integrated, includes a substrate 10, a first lower electrode layer D1Y, a first solid electrolyte layer S1, a first upper electrode layer D1X, a second lower electrode layer D2Y, a second solid electrolyte layer S2, and a second upper electrode layer D2X. The solid electrolyte integrated device 100 according to the second embodiment does not include the first and second additional electrode layers D1A and D2A that are included in the first embodiment.

The first lower electrode layer D1Y is disposed on a first main surface 10a so as to surround a portion of the edge of the first opening P1a on the first main surface 10a side of the first through-hole P1.

The second lower electrode layer D2Y is disposed on the first main surface 10a so as to surround a portion of the edge of the second opening P2a on the first main surface 10a side of the second through-hole P2.

The other features of the solid electrolyte integrated device 100 according to the second embodiment are the same as those of the first embodiment.

Therefore, like the first embodiment, the solid electrolyte integrated device 100 according to the second embodiment is capable of performing a desired function at a lower current value by electrically connecting a plurality of solid electrolyte elements with the first and second solid electrolyte layers S1 and S2 in series.

The first and second solid electrolyte layers S1 and S2 that are electrically connected in series with each other of the solid electrolyte integrated device 100 according to the second embodiment are formed on the first main surface 10a (and on the first and second lower electrode layers D1Y and D2Y) of the substrate 10 formed of glass, for example, having predetermined rigidity. Therefore, stress applied to the first and second solid electrolyte layers S1 and S2 may be reduced.

Thus, the solid electrolyte integrated device according to this embodiment is capable of reducing a current value and stress applied to the solid electrolyte layers by connecting a plurality of solid electrolyte layers in series.

Next, an example of a method of manufacturing the above-described solid electrolyte integrated device 100 according to the second embodiment shown in FIG. 25 will be described below.

FIGS. 26 to 30 are cross-sectional views showing an example of the method of manufacturing the solid electrolyte integrated device 100 according to the second embodiment shown in FIG. 25.

Figure 26:
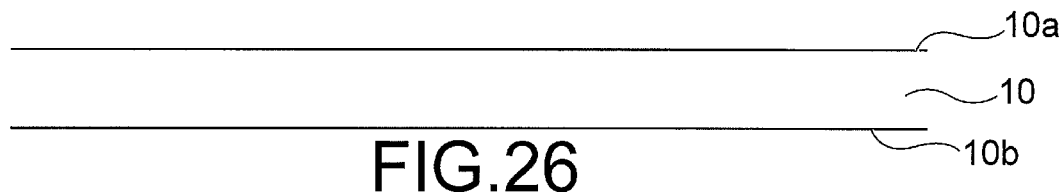
FIG. 26 is a cross-sectional view showing an example of the method of manufacturing the solid electrolyte integrated device 100 according to the second embodiment shown in FIG. 25.

First, as in the above-described first step, a substrate 10 having a first main surface 10a and a second main surface 10b that is opposite to the first main surface 10a is prepared as shown in FIG. 26, the surfaces of the substrate 10 being electrically insulated.

Figure 27:
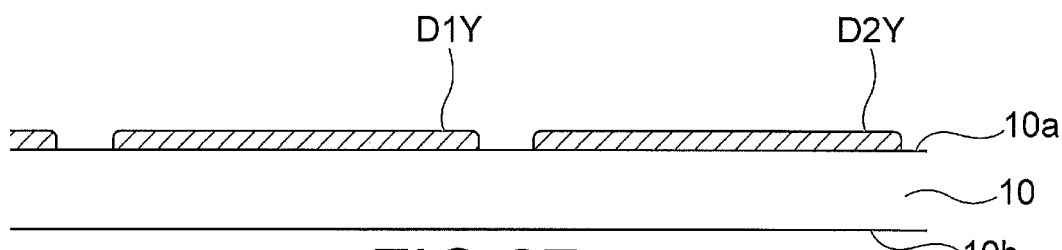
FIG. 27 is a cross-sectional view showing examples of respective step of the method of manufacturing the solid electrolyte integrated device 100, being continuous from FIG. 26.

Next, as in the second step described above, a first lower electrode layer D1Y and a second lower electrode layer D2Y, which are conductive, are formed on the first main surface 10a (including the surfaces of the metal Z in the first and second through-holes P1 and P2 on the first main surface 10a side) of the substrate 10, as shown in FIG. 27.

Figure 28:
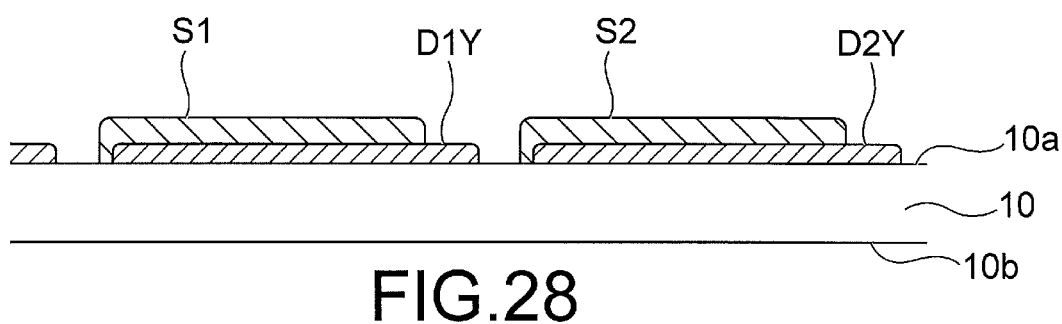
FIG. 28 is a cross-sectional view showing examples of respective step of the method of manufacturing the solid electrolyte integrated device 100, being continuous from FIG. 27.

Then, as in the third step described above, a first solid electrolyte layer S1 having ion conductivity is disposed on and electrically connected to the first lower electrode layer D1Y, as shown in FIG. 28. Furthermore, a second solid electrolyte layer S2 having ion conductivity is disposed on and electrically connected to the second lower electrode layer D2Y so as to be separated from the first solid electrolyte layer S1.

Figure 29:
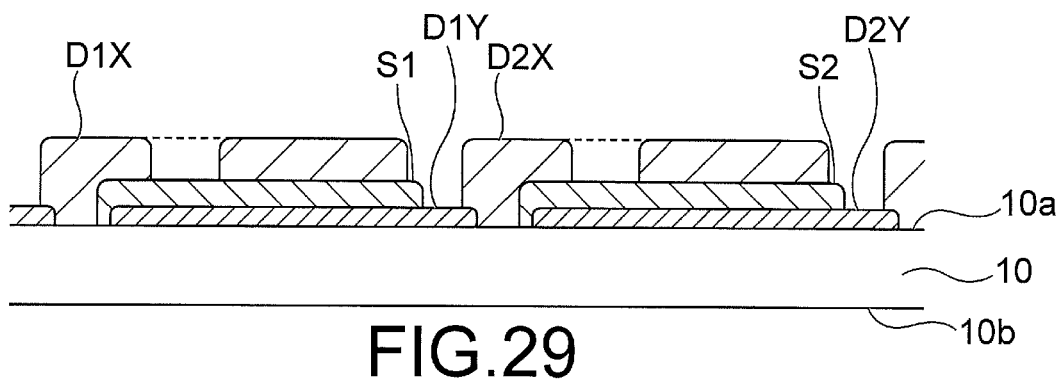
FIG. 29 is a cross-sectional view showing examples of respective step of the method of manufacturing the solid electrolyte integrated device 100, being continuous from FIG. 28.

Thereafter, as in the fourth step described above, a first upper electrode layer D1X is formed on the first main surface 10a side so as to be separated from the first lower electrode layer D1Y by the first solid electrolyte layer S1 as shown in FIG. 29, the first upper electrode layer D1X being conductive and electrically connected to the first solid electrolyte layer S1. Furthermore, a second upper electrode layer D2X is formed on the first main surface 10a side so as to be separated from the second lower electrode layer D2Y by the second solid electrolyte layer S2, the second upper electrode layer D2X being conductive and electrically connected to the second solid electrolyte layer S2.

By the step shown in FIG. 29, the first lower electrode layer D1Y and the second upper electrode layer D2X are electrically connected to each other on the first main surface 10a side.

Figure 30:
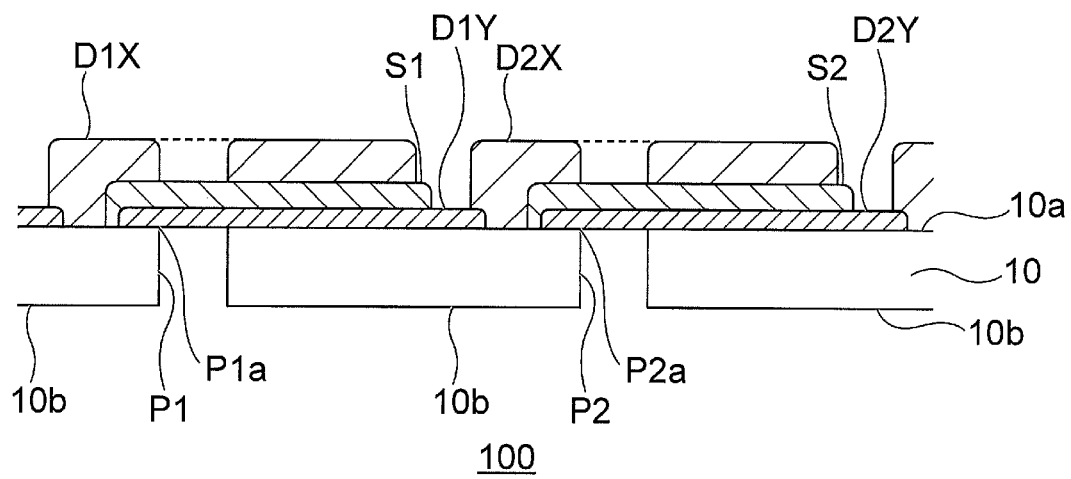
FIG. 30 is a cross-sectional view showing examples of respective step of the method of manufacturing the solid electrolyte integrated device 100, being continuous from FIG. 29.

Next, as in the fifth step described above, a first through-hole P1 and a second through-hole P2 between the first main surface 10a and the second main surface 10b of the substrate 10 are formed from the second main surface 10b side, as shown in FIG. 30.

Thereafter, the first and second through-holes P1 and P2 between the first main surface 10a and the second main surface 10b are formed, and a third through-hole D1YP that is continuous from the first through-hole P1 is formed in the first lower electrode layer D1Y and a fourth through-hole D2YP that is continuous from the second through-hole P2 is formed in the second lower electrode layer D2Y from the second main surface 10b side of the substrate 10.

The opening of the first lower electrode layer D1Y is formed so that the first lower electrode layer D1Y surrounds the edge of the first opening P1a on the first main surface 10a side of the first through-hole P1, and the opening of the second lower electrode layer D2Y is formed so that the second lower electrode layer D2Y surrounds the edge of the second opening P2a on the first main surface 10a of the second through-hole P2.

The first through-hole P1 and the second through-hole P2 may be formed by selectively etching the substrate 10 from the second main surface 10b side by reactive ion etching as described above. The third through-hole D1YP and the fourth through-hole D2YP may be formed by selectively etching the first and second lower electrode layers D1Y and D2Y from the second main surface 10b side via the first through-hole P1 and the second through-hole P2 by reactive ion etching on different conditions.

The solid electrolyte integrated device 100 according to the second embodiment shown in FIG. 25 may be manufactured in the above-described steps.

The third and fourth through-holes D1YP and D2YP may be formed in advance at the same time as or after the first and second lower electrode layers D1Y and D2Y are formed (in the step shown in FIG. 27), and then the first through-hole P1 that is continuous from the third through-hole D1YP and the second through-hole P2 that is continuous from the fourth through-hole D2YP may be formed from the second main surface 10b side of the substrate 10.

The structure of the first and second solid electrolyte layers S1 and S2 and the first and second upper electrode layers D1X and D2X may be the same as that of one of the first embodiment the first to third modifications of the first embodiment.

While certain embodiments have been described, these embodiments have been presented by way of example only, and are not intended to limit the scope of the inventions. The embodiments may be embodied in a variety of other forms. Furthermore, various omissions, substitutions and changes in the form of the methods and systems described herein may be made without departing from the spirit of the inventions. The embodiments and their modifications are included in the scope and the subject matter of the invention, and at the same time included in the scope of the claimed inventions and their equivalents.

EXPLANATION OF REFERENCES

100: solid electrolyte integrated device
10: substrate
10a: first main surface
10b: second main surface
D1Y: first lower electrode layer
S1: first solid electrolyte layer
D1X: first upper electrode layer
D1A: first additional electrode layer
D2Y: second lower electrode layer
S2: second solid electrolyte layer
D2X: second upper electrode layer
D2A: second additional electrode layer
P1: first through-hole
P2: second through-hole

The invention claimed is:

1. A solid electrolyte integrated device including a substrate with electrically insulated surfaces including a first main surface disposed on one side and a second main surface disposed on an opposite side of the first main surface, the substrate having two through-holes, a first through-hole and a second through-hole, between the first main surface and the second main surface,
the solid electrolyte integrated device comprising:
a first lower electrode layer, which is conductive, disposed on the first main surface so as to cover a portion of a first opening on the first main surface side of the first through-hole or to surround an edge of the portion of the first opening;
a first solid electrolyte layer disposed on and electrically connected to the first lower electrode layer;
a first upper electrode layer disposed on the first main surface side so as to be separated from the first lower electrode layer by the first solid electrolyte layer and electrically connected to the first solid electrolyte layer;
a second lower electrode layer, which is conductive, disposed on the first main surface so as to cover a portion of a second opening on the first main surface side of the second through-hole or to surround an edge of the portion of the second opening;
a second solid electrolyte layer disposed on the second lower electrode layer so as to be separated from the first solid electrolyte layer and electrically connected to the second lower electrode layer; and
a second upper electrode layer disposed on the first main surface side so as to be separated from the second lower electrode layer by the second solid electrolyte layer and electrically connected to the second solid electrolyte layer, wherein the first lower electrode layer and the second upper electrode layer are electrically connected to each other on the first main surface side,
wherein the first upper electrode layer, the first lower electrode layer, the second upper electrode layer, and the second lower electrode layer transmit ions and/or have ion redox ability, contain a metal or a metal oxide or both of a metal and a metal oxide, and have a permeable portion,
wherein the first lower electrode layer has a third through-hole formed in a vertical direction to continue to the first through-hole of the substrate,
wherein the second lower electrode layer has a fourth through-hole formed in the vertical direction to continue to the second through-hole of the substrate,
wherein a portion of the first solid electrolyte layer is filled in the third through-hole of the first lower electrode layer, and
wherein a portion of the second solid electrolyte layer is filled in the fourth through-hole of the second lower electrode layer.

2. The solid electrolyte integrated device according to claim 1,
wherein the first lower electrode layer has a first region that is covered by the first solid electrolyte layer, and a second region that is not covered by the first solid electrolyte layer, and
wherein the second region of the first lower electrode layer is electrically connected to the second upper electrode layer.

3. The solid electrolyte integrated device according to claim 2, wherein the portion including the second region of the first lower electrode layer is covered by the second upper electrode layer.

4. The solid electrolyte integrated device according to claim 2, wherein a portion of a side surface of the second solid electrolyte layer is covered by the second upper electrode layer.

5. The solid electrolyte integrated device according to claim 1,
wherein the first solid electrolyte layer and the second solid electrolyte layer are electrically connected in series via the first lower electrode layer and the second upper electrode layer, and
wherein the second upper electrode layer extends from an upper portion of one end of the second solid electrolyte layer to an upper portion of one end of the first lower electrode layer.

6. The solid electrolyte integrated device according to claim 1, further comprising:
a first additional electrode layer disposed in the first through-hole near the first opening and electrically connected to the first lower electrode layer; and
a second additional electrode layer disposed in the second through-hole near the second opening, and electrically connected to the second lower electrode layer.

7. The solid electrolyte integrated device according to claim 1,
wherein the first upper electrode layer has a fifth through-hole formed in the vertical direction, a normal line that is perpendicular to the first main surface and passing through the third through-hole of the first lower electrode layer passing through the fifth through-hole, and
wherein the second upper electrode layer has a sixth through-hole formed in the vertical direction, a normal line that is perpendicular to the first main surface and passing through the fourth through-hole of the second lower electrode layer passing through the sixth through-hole.

8. The solid electrolyte integrated device according to claim 1,
  wherein the first solid electrolyte layer covers a portion of a top surface to a portion of a side surface of the first lower electrode layer, and
  wherein the second solid electrolyte layer covers a portion of a top surface to a portion of a side surface of the second lower electrode layer.

9. The solid electrolyte integrated device according to claim 8,
  wherein the first upper electrode layer covers a portion of a top surface to a portion of a side surface of the first solid electrolyte layer, and
  wherein the second upper electrode layer covers a portion of a top surface to a portion of a side surface of the second solid electrolyte layer.

10. The solid electrolyte integrated device according to claim 1, wherein the substrate is formed of glass.

11. The solid electrolyte integrated device according to claim 1, wherein the substrate is a silicon substrate, on an outer surface of which silicon oxide is disposed.

* * * * *